US011157658B2

(12) United States Patent
Eu et al.

(10) Patent No.: US 11,157,658 B2
(45) Date of Patent: Oct. 26, 2021

(54) SECURE LOADING OF SECRET DATA TO NON-PROTECTED HARDWARE REGISTERS

(71) Applicant: GEMALTO SA, Meudon (FR)

(72) Inventors: Nicholas Xing Long Eu, Gemenos (FR); Annus Bin Khalid Syed, Gemenos (FR); Juan Manolo Alcasabas, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 325 days.

(21) Appl. No.: 16/315,105

(22) PCT Filed: Jun. 14, 2017

(86) PCT No.: PCT/EP2017/064494
§ 371 (c)(1),
(2) Date: Jan. 3, 2019

(87) PCT Pub. No.: WO2018/007113
PCT Pub. Date: Jan. 11, 2018

(65) Prior Publication Data
US 2019/0311154 A1    Oct. 10, 2019

(30) Foreign Application Priority Data

Jul. 4, 2016 (EP) .................................. 16305841

(51) Int. Cl.
*G06F 21/72* (2013.01)
*G06F 21/60* (2013.01)
*H04L 9/00* (2006.01)

(52) U.S. Cl.
CPC ............ *G06F 21/72* (2013.01); *G06F 21/602* (2013.01); *H04L 9/003* (2013.01);
(Continued)

(58) Field of Classification Search
CPC ............. G06F 21/72; G06F 2207/7257; G06F 2207/7223; H04L 2209/08; H04L 2209/12
See application file for complete search history.

(56) References Cited

U.S. PATENT DOCUMENTS

| 6,299,069 B1 | 10/2001 | Shona | |
|---|---|---|---|
| 2012/0144205 A1* | 6/2012 | Shu | G06F 21/85 713/189 |
| 2013/0145130 A1* | 6/2013 | Brelot | G06F 9/384 712/217 |

FOREIGN PATENT DOCUMENTS

WO    WO03081398 A2    10/2003

OTHER PUBLICATIONS

D. May et al., Random Register Renaming to Foil DPA, 2001, Department of Computer Science, University of Bristol, UK, pp. 1-12 (Year: 2001).*

(Continued)

*Primary Examiner* — Ellen Tran
(74) *Attorney, Agent, or Firm* — The Jansson Firm; Pehr B. Jansson

(57) ABSTRACT

The present invention relates to a method to securely load set of sensitive data hardware registers with sensitive data on a chip supporting hardware cryptography operations, said method comprising the following steps monitored by software instructions, at each run of a software: select a set of available hardware registers listed in a predefined list listing, in the chip architecture, the unused hardware registers and other relevant hardware registers not handling sensitive data and not disrupting chip functionality when loaded, establish an indexible register list of the address of the sensitive data hardware registers and of the hardware registers in the set of available hardware registers, in a loop, write each hardware register in this register list with random data, a random number of times, in random order except the last writing in (Continued)

each of the sensitive data hardware registers where a part of the sensitive data is written.

9 Claims, 2 Drawing Sheets

(52) U.S. Cl.
CPC .............. *G06F 2207/7223* (2013.01); *G06F 2207/7257* (2013.01); *H04L 2209/08* (2013.01); *H04L 2209/12* (2013.01)

(56) References Cited

OTHER PUBLICATIONS

Y. Lu et al., Lightweight DPA Resistant Solution on FPGA to Counteract Power Models, 2010, Institute of ECIT Queen's University Belfast, UK, pp. 1-6 (Year: 2010).*
Ganesh Chardrakantrao Khedkar, Power Profile Obfuscation using RRAMs to Couter DPA Attacks, 2013, Rochester Institute of Technology, pp. 1-73 (Year: 2013).*
PCT/EP2017/064494, European Search Report, dated Jul. 25, 2017, European Patent Office, P.B. 5818 Patentlaan 2 NL—2280 HV Rijswijk.
PCT/EP2017/064494, Written Opinion of the European Searching Authority, dated Jul. 25, 2017, European Patent Office, P. B. 5818 Patentlaan 2 NL—2280 HV Rijswijk.

* cited by examiner

SECURE LOADING OF SECRET DATA TO NON-PROTECTED HARDWARE REGISTERS

FIELD OF THE INVENTION

The present invention relates to a method to securely load set of sensitive data hardware registers on a chip supporting hardware cryptography operations.

The invention also pertains to a chip implementing said method and to a computer program product having instructions to implement the method of the invention.

BACKGROUND OF THE INVENTION

A chip that supports hardware cryptography operations, requires security critical data to be loaded in hardware registers. For example AES encryption will require loading of keys and data to the hardware registers.

The loading of keys to the hardware registers is critical, since the hardware itself protects the computation but the loading of the keys is susceptible to side channel attacks. Side channel attacks are any attacks mounted based on the side information leaked by the chip. Side channel attack is any attack based on information gained from physical implementation of a cryptosystem, rather than brute force or theoretical weakness in the algorithms. For example, timing information, power consumption, electromagnetic leaks or even sound can provide an extra source of information, which can be exploited to break the system.

Similar attacks can be mounted by having access to an identical experimental device that can be programmed freely. These attacks are called template attacks. For such an attack the attacker only needs one side channel curve from the attacked card.

There are certain hardware counter measures which provide a secure loading. For example clock jitter, is one of the possible hardware counter measure. Clock jitter refers to a varying clock signal where the amplitude remains the same but the period changes slightly from the original making side channel analysis difficult by implying a deviation of the clock from periodicity of the periodic signal presumed by the attacker.

Another possible hardware solution is to have masked key loading. This means that security critical data is masked before it is loaded in the hardware and hardware removes the mask during computation.

But these counter measures can only be implemented by the chip manufacturer and only enabled/disabled by the software.

Thus, in certain chips the loading of the keys is not secure, since hardware does not support masked key loading, i.e. key masked before loading to hardware registers and mask removed in the hardware itself, or application of clock jitter, i.e. deviation of clock from periodic signal or of other hardware counter measures. This poses a security issue where the key can be retrieved by side channel attacks.

Further alternative and advantageous solutions would, accordingly, be desirable in the art.

SUMMARY OF THE INVENTION

The present invention aims at securing sensitive data loading while not implying specific hardware requirements as it is contrarily the case in the solution of the prior art.

The present invention is defined, in its broadest sense, as a method to securely load set of sensitive data hardware registers with sensitive data on a chip supporting hardware cryptography operations, said method comprising the following steps monitored by software instructions, at each run of a software:

select a set of available hardware registers listed in a predefined list listing, in the chip architecture, the unused hardware registers and other relevant hardware registers not handling sensitive data and not disrupting chip functionality when loaded, establish an indexible register list of the address of the sensitive data hardware registers and of the hardware registers in the set of available hardware registers, in a loop, write each hardware register in this register list with random data, a random number of times, in random order except the last writing in each of the sensitive data hardware registers where a part of the sensitive data is written. The invention also applies to hardware chip where writing to a sensitive register takes two or more actions, at least one action being performed according to the principle of the invention.

The solution proposed in the invention is purely software and can be used with or without hardware counter measures. If used with hardware counter measures it will strengthen the security.

With the invention, the loading of registers in random order with random data scrambles the real key write. Furthermore, the writing of the random data to the key/sensitive data registers makes each acquired side channel information different in both, order due to random sequence and duration due to random number of writes per register.

The attacker cannot identify when the real key/sensitive data is written to the real key registers and this will protect against side channel attacks like SPA (simple power analysis) & template. The software randomization of key loading provides protection against these attacks.

Since the invention is a software based solution, it can be used standalone and if used in addition to hardware countermeasures it will increase the security even further.

Through a side channel analysis of a chip implementing the invention, the side channel power curves will show lots of register writes when the key is loaded as compared to normal load of key.

In the invention, random and real key data are from RAM. As far as the attacker does not know the exact RAM address of real data, he/she cannot know when real data is accessed. Also modern chips have encrypted address buses which form an additional protection.

According to an advantageous embodiment, the method further comprises a step of further selecting key registers of other cryptographic hardware.

Involving such other registers increases the permutation. Thus DES key registers can be selected and added to the loop where AES key registers are written. It is here noted that the list can be different depending on the considered functionality. In particular, such registers can be added to the available register list for only the AES key register writing among which the set of available registers is selected.

According to an advantageous embodiment, the write step of the method of the invention comprises comprising the following steps:

associate a number of load times to each hardware register in the indexible list, establish a register write sequence listing the register address as many times as the associated load times, shuffling the register write sequence to determine a processing order in a shuffled register write sequence, identifying the last occurrence for the sensitive data registers in the shuffled register write sequence, for the whole set of address in the shuffled register write sequence, write each hardware register with random data.

This embodiment is simple to implement and provides the necessary write of each hardware register with random data, a random number of times, in random order except the last writing in each of the sensitive data hardware registers where a part of the sensitive data is written.

The register write sequence corresponds to an enlarged indexible register list.

Therefore, the method according to the present invention allows reducing the risks of malicious attacks. At least, the attacks are more complex to carry out for a malicious attacker.

The present invention also relates to a chip implementing the method of the invention and to a computer program product having instructions to implement the method of the invention.

In the invention, the hardware behavior and the processing of data to be loaded in hardware register is distinct from the one of prior art and can be tracked and observed as original and specific handling of data.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
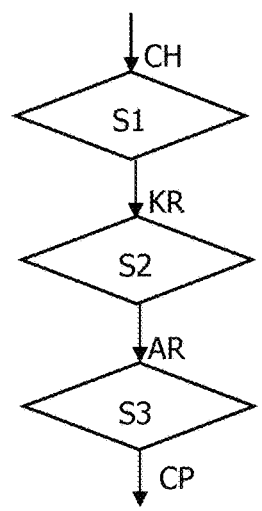
FIG. 1 schematically shows a flowchart of a method to obtain a computer program implementing the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

It is here first described the elaboration of a computer program having a given functionality and implementing the method of the invention. This is illustrated on FIG. 1. In a first step S1, the registers which will store sensitive data K are identified on a chip CH. These will be called the key registers KR. This step is done once at the writing of the computer program according to the invention.

Also, a list of available hardware registers AR on the chip CH is established in a step S2, which do not affect the desired functionality if written. These will be called the unused registers. It includes the registers which remain, according to the chip architecture, unused or not sensitive for the implementation of the functionality of the program.

A list of such available hardware registers AR is done once at the writing of the program implementing the invention.

Then the computer program CP is written in a step S3 in order to execute the following steps.

Figure 2:
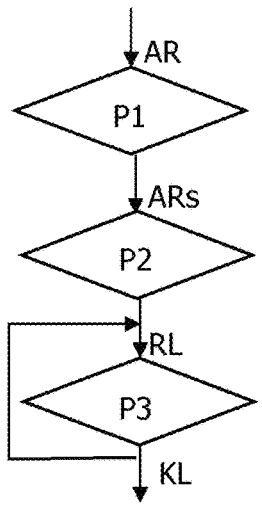
FIG. 2 schematically shows a flowchart of the method of the invention.

FIG. 2 shows the steps of the program according to the invention itself.

Figure 4:
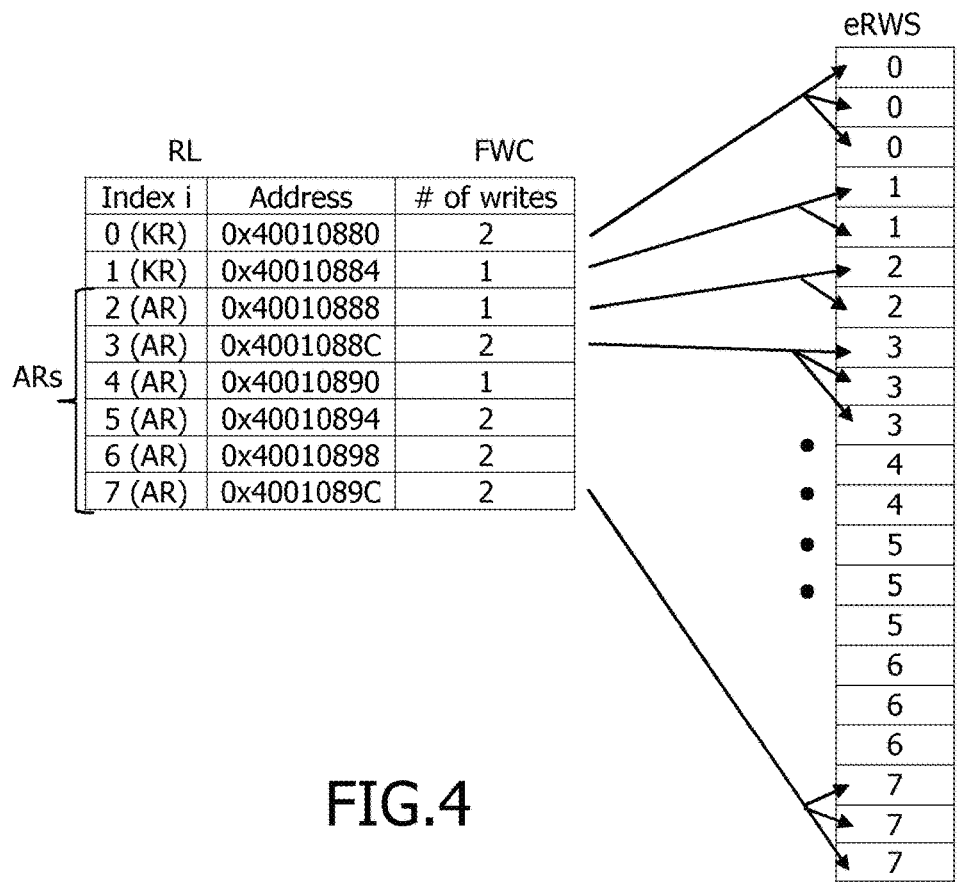
FIG. 4 schematically illustrates an implementation of the method of the invention.
Figure 5:
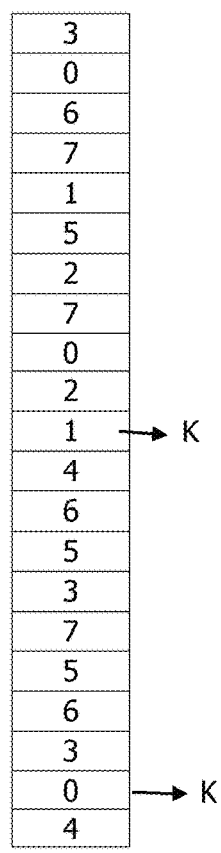
FIG. 5 schematically illustrates the register write sequence shuffling step of the method of the invention.

In a first step P1, a set of available hardware register ARs is selected. For example, six available hardware registers AR are selected as shown on FIG. 4. In a second step P2, the key registers and the selected hardware registers are arranged in one array RL, addressable through an index. In the example of FIG. 4, index 0 and 1 are attributed to the key registers KR while available registers are indexed from 2 to 7. in a register list RL listing the registers to be used during this run of the computer program. In this example, we have identified two key registers and six available registers. The total number of registers is thus eight.

To get the address of a register, the array register list RL is accessed by index i. Here, RL[0] will give 0x40010880 (KR). RL[1] will give 0x40010884 (KR). RL[2] will give 0x40010888 (AR). RL[3] will give 0x4001088C (AR). RL[4] will give 0x40010890 (AR). RL[5] will give 0x40010894 (AR). RL[6] will give 0x40010898 (AR). RL[7] will give 0x40010890 (AR).

The selection of the set of available hardware register is advantageously done at each run of the software.

Step P3 is a loop which writes each hardware register with random data, a random number of times, in random order except the last writing in each of the key hardware registers where a part of the valid key is written. After all the iterations in the loop, the loaded key LD sub-parts are loaded in the key registers.

Figure 3:
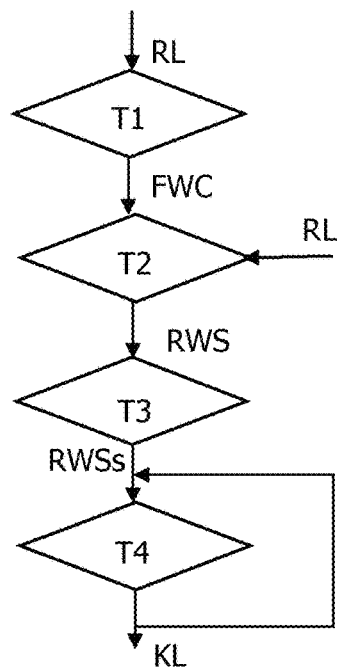
FIG. 3 schematically illustrates an embodiment of the third step of the method of the invention.

FIG. 3 illustrates an embodiment of the third step of the invention. In a step T1, an array of fake write counter FWC is created to store the number of fake writes for each register listed in the register list RL.

The fake write counter comprises an element by register and it initializes each element with a random number capped by maximum fake writes. In the shown example, maximum fake writes is two. Thus each element in FWC can take the value 1 or 2. It is here noted that the fake write counter FWC is associated to the same index as the register list RL.

Since it is ensured that each element of the fake write counter FWC has the same indices as RL, initializing FWC[0] to 2 means random data will be written twice to 0x40010880 (KR) because accessing RL[0] gives 0x40010880. Below is an explanation of the array FWC[i] when indexed by i:

FWC[0]=2, means write random data 2 times to 0x40010880 (KR). FWC[1]=1, means write random data 1 time to 0x40010884 (KR). FWC[2]=1, means write random data 1 time to 0x40010888 (AR). FWC[3]=2, means write random data 2 time to 0x40010880 (AR). FWC[4]=1, means write random data 1 time to 0x40010890 (AR). FWC[5]=2, means write random data 2 time to 0x40010894 (AR). FWC[6]=2, means write random data 2 time to 0x40010898 (AR). FWC[7]=2, means write random data 2 time to 0x4001089C (AR).

Then in a step T2, further illustrated on FIG. 4, a register write sequence array RWS is created by initializing each element of RWS with the lookup index to the registers in register list RL using the fake write counter FWC.

The maximum size of the array is the total number of registers multiplied by the maximum number of fake write plus one.

In the example shown on FIG. 4, FWC[0] is 2, so the first 3 elements of register write sequence RWS are 0's. The next 2 elements are 1's because FWC[1] is 1. An additional write is required to ensure that the last write to the real key register KR is a part of the real key K. In general, a whole key cannot fit in one register. Therefore each register contains a chunk of the whole key.

The first three elements of all 0's means that the RL[0] (0x40010880-key register) will be written three times, two times with fake key and once with real key since RL[0] is the real key register address. If RL[i] is not real key register address all the writes will be random data.

In a step T3, a shuffle of the elements in register write sequence RWS is performed and a shuffle register write sequence RWSs is obtained.

Then, in a step T4, the elements in the register write sequence RWSs are used to access all the registers in register list RL and to write fake and real keys to them. The pseudo code for accessing registers is the following: run a loop through RWSs[ ], from i=0 to sum of all elements in fake write counter FWC[ ]. For each element RWSs[ ], j=RWSs[i] is retrieved. Random data are written to the register RL[j]. For the last write to real key register KR, the real key is written, otherwise all the writes are random data writes even to real key register. At the end of loops of step T4, a loaded key LD is obtained.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to securely load set of sensitive data hardware registers with sensitive data on a chip supporting hardware cryptography operations, said method comprising the following steps monitored by software instructions, at each run of a software:
   select a set of available hardware registers listed in a predefined list listing, in the chip architecture, the unused hardware registers and other relevant hardware registers not handling sensitive data and not disrupting chip functionality when loaded,
   establish an indexable register list of the addresses of the sensitive data hardware registers and of the hardware registers in the set of available hardware registers,
   in a loop, write each hardware register in this register list with random data, a random number of times, in random order except the last writing in each of the sensitive data hardware registers where a part of the sensitive data is written.

2. The method according to claim 1, comprising a step of further selecting key registers of other cryptographic hardware.

3. The method according to claim 1, the write step comprises the following steps:
   associating a number of load times to each hardware register in the indexable register list,
   establishing a register write sequence listing the register address as many times as the associated load times,
   shuffling the register write sequence to determine a processing order in a shuffled register write sequence,
   identifying the last occurrence for the sensitive data registers in the shuffled register write sequence,
   for the whole set of addresses in the shuffled register write sequence, writing each hardware register with random data.

4. A chip comprising:
   a set of data hardware registers and supporting hardware cryptography operations, and
   a computer program directing the chip to:
   identify available hardware register, unused hardware registers, and other relevant hardware registers not handling sensitive data and not disrupting chip functionality when loaded;
   establish an indexible register list of addresses of the sensitive data hardware registers, and of the hardware registers in the set of available hardware registers; and
   in a loop, write each hardware register in this register list with random data, a random number of times, in random order except the last writing in each of the sensitive data hardware registers where a part of the sensitive data is written.

5. The chip of claim 4, wherein the computer program further comprises instructions directing the chip to:
   select key registers of other cryptographic hardware.

6. The chip of claim 4, wherein the computer program further comprises instructions directing the chip to:
   associate a number of load times to each hardware register in the indexable register list,
   establish a register write sequence listing the register address as many times as the associated load times,
   shuffle the register write sequence to determine a processing order in a shuffled register write sequence,
   identify the last occurrence for the sensitive data registers in the shuffled register write sequence,
   for the whole set of addresses in the shuffled register write sequence, write each hardware register with random data.

7. A computer readable device having instruction directing a chip, having a set of data hardware registers and supporting hardware cryptography, to:
   identify available hardware register, unused hardware registers, and other relevant hardware registers not handling sensitive data and not disrupting chip functionality when loaded;
   establish an indexible register list of addresses of the sensitive data hardware registers, and of the hardware registers in the set of available hardware registers; and
   in a loop, write each hardware register in this register list with random data, a random number of times, in random order except the last writing in each of the sensitive data hardware registers where a part of the sensitive data is written.

8. The computer readable device of claim 7, further comprising instructions directing the chip to:
   select key registers of other cryptographic hardware.

9. The computer readable device of claim 7, further comprising instructions directing the chip to:
- associate a number of load times to each hardware register in the indexable register list,
- establish a register write sequence listing the register address as many times as the associated load times,
- shuffle the register write sequence to determine a processing order in a shuffled register write sequence,
- identify the last occurrence for the sensitive data registers in the shuffled register write sequence,
- for the whole set of addresses in the shuffled register write sequence, write each hardware register with random data.

\* \* \* \* \*